Jan. 8, 1952 J. McFARLANE 2,581,548
MECHANISM FOR AUTOMATICALLY POSITIONING A MEMBER
IN A SERIES OF PREDETERMINED POSITIONS
Filed Dec. 3, 1947 6 Sheets-Sheet 1
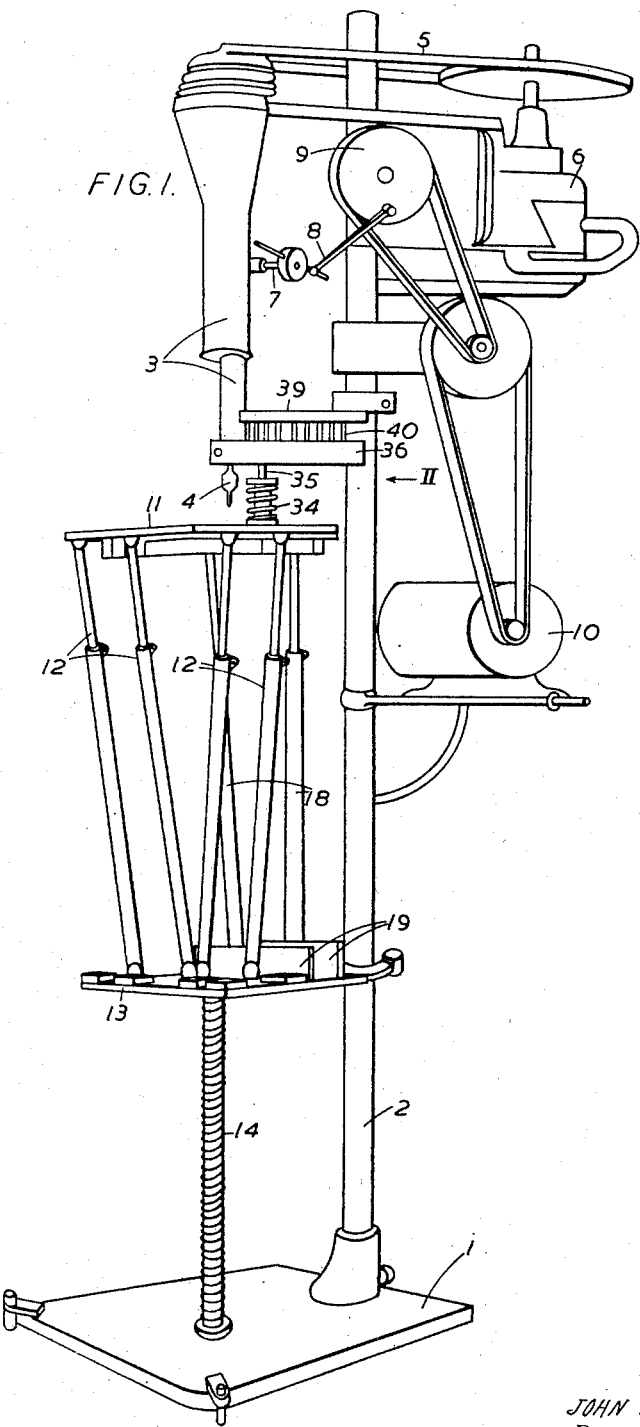
FIG. I.
Inventor
JOHN McFARLANE
By Otto Munk
His Attorney

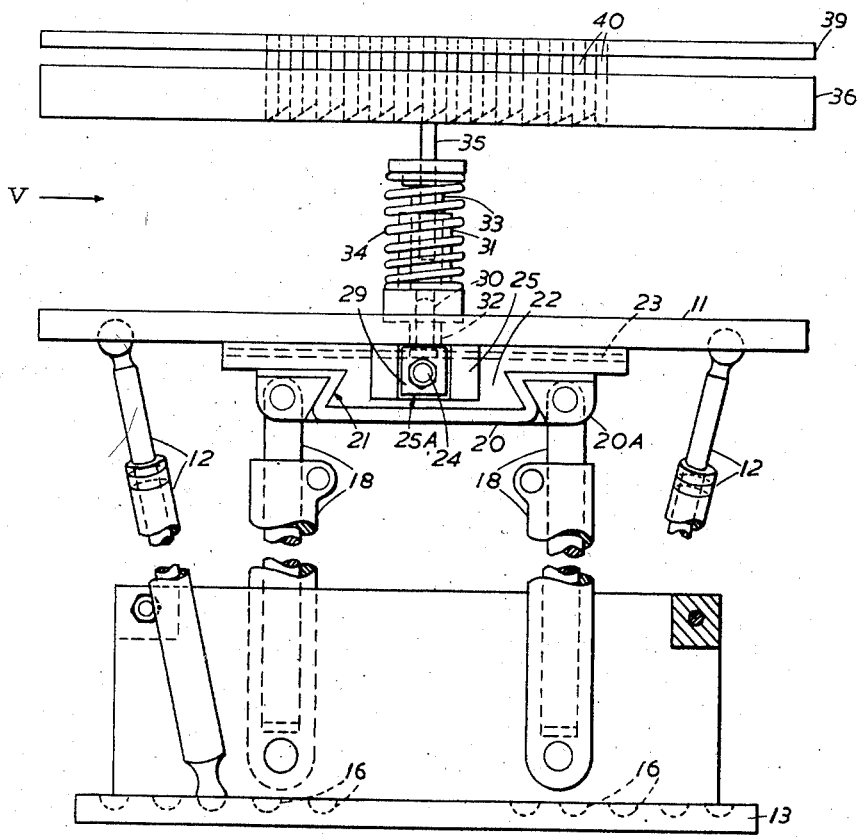
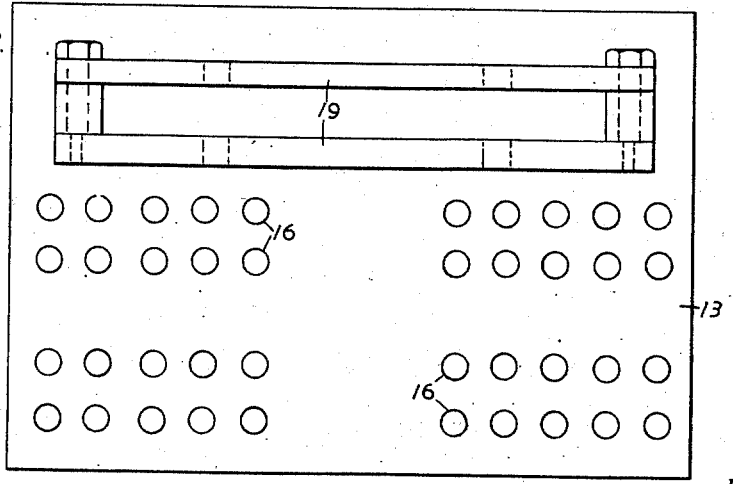

Jan. 8, 1952   J. McFARLANE   2,581,548
MECHANISM FOR AUTOMATICALLY POSITIONING A MEMBER
IN A SERIES OF PREDETERMINED POSITIONS
Filed Dec. 3, 1947   6 Sheets-Sheet 3

Inventor
JOHN McFARLANE
By Otto Munk
His Attorney

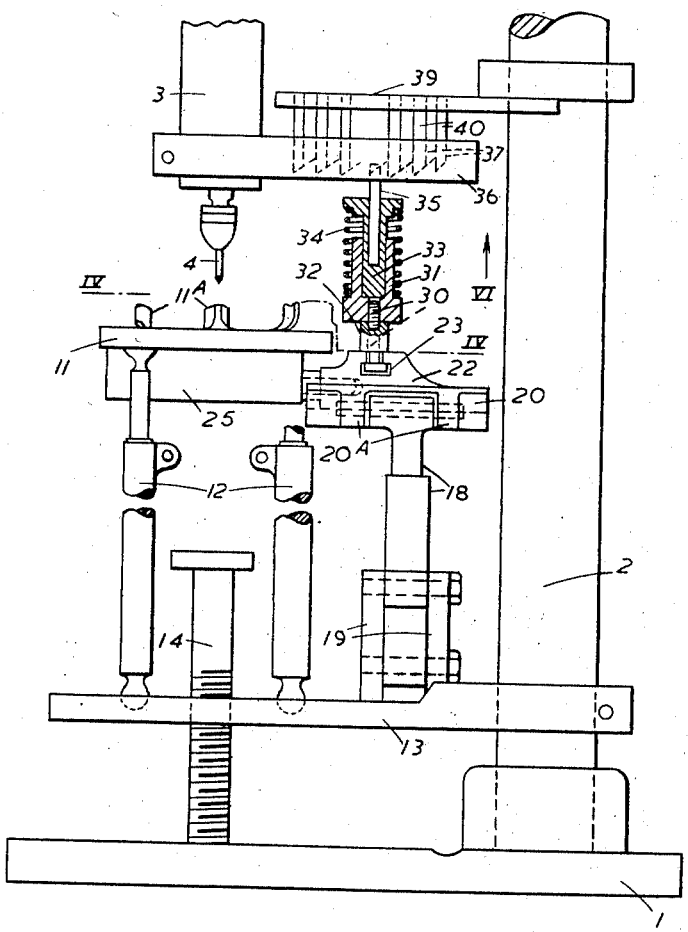

Jan. 8, 1952          J. McFARLANE          2,581,548
MECHANISM FOR AUTOMATICALLY POSITIONING A MEMBER
IN A SERIES OF PREDETERMINED POSITIONS
Filed Dec. 3, 1947          6 Sheets-Sheet 5

Inventor
JOHN McFARLANE
By Otto Munk
His Attorney

Jan. 8, 1952 J. McFARLANE 2,581,548
MECHANISM FOR AUTOMATICALLY POSITIONING A MEMBER
IN A SERIES OF PREDETERMINED POSITIONS
Filed Dec. 3, 1947 6 Sheets-Sheet 6
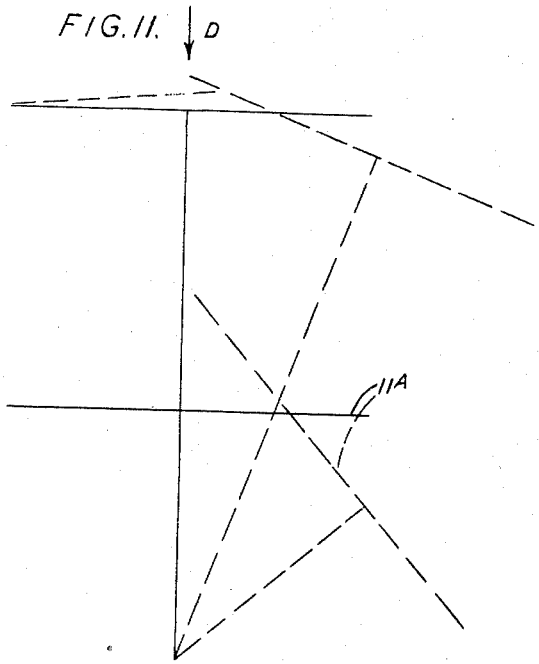
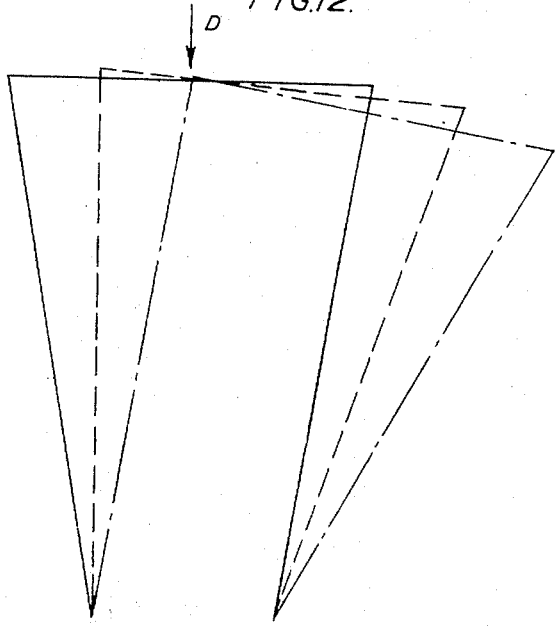
Inventor
JOHN McFARLANE
By Otto Munk
His Attorney Patented Jan. 8, 1952

2,581,548

UNITED STATES PATENT OFFICE 2,581,548

MECHANISM FOR AUTOMATICALLY POSITIONING A MEMBER IN A SERIES OF PREDETERMINED POSITIONS

John McFarlane, Bangor, Northern Ireland

Application December 3, 1947, Serial No. 789,512
In Great Britain December 5, 1946

21 Claims. (Cl. 144—96)

This invention relates to mechanism for automatically positioning a member in a series of predetermined positions and relates more especially to such mechanism for relatively positioning a work holder and a tool or instrument in machines where operations have to be effected on the work at predetermined positions. A typical example of such machine is a drilling machine and more especially a machine for drilling holes in wooden brush heads or for both drilling the holes and filling in the bristle tufts.

One object of the invention is to provide a mechanism for the purpose set forth which comprises a member having track means therein with a plurality of locating recesses associated with the track, a follower member adapted to engage said track means and recesses, means normally tending to cause a relative shifting or translational movement between said members such that the follower tends to move stepwise along the track means from one recess to the next which arrests said movement, and means for causing relative separative and advancing movement between said members whereby the follower and a recess can be disengaged to allow said translational movement and engagement between the follower member and the next recess.

Preferably the track slopes down from one recess to the next at such gradient that if the follower is disengaged from a recess and caused to rest on the higher part of the incline and assuming there is a pressure between the follower and track member, as for instance, by spring or gravity means, the follower will be caused to move relatively to the track until it reaches and is stopped by the next recess. Thus the translational movement arises from the pressure between track and follower acting in conjunction with the gradient. Manifestly the translational movement may be imparted to the track member but preferably this movement is given to the follower member which, in that case, will be connected to the work holder or the like which has to be positioned.

In the case of a follower which is spring or otherwise yieldingly urged into engagement with the track and recesses, means has to be provided to release the follower from the recess. Said means may comprise releasing pins slidably entering holes in the track member, which holes also constitute the positioning recesses for the follower. By a relative movement between the track member and the release pins the latter can be caused to move into the holes and push out the follower until it reaches the level of the edge of the upper end of the track whereupon the follower slides down or along the track until it snaps into the next retaining hole or recess. Preferably the end of each releasing pin is chamfered or inclined such that when it reaches the track level it forms in effect an extension thereof and so ensures that the follower will move off on to the track. In addition or alternatively the end of the follower, which may be in the form of a pin, has a complementary chamfer or incline to ensure or further ensure that the follower will at once move off on to the track.

In order that the invention may be clearly understood the following more specific embodiment as applied to a well known type of drilling machine for brush heads will now be described but purely by way of example with reference to the accompanying drawings in which:

Fig. 1 is a perspective view of the drilling machine showing the main parts thereof.

Fig. 2 is a part elevation to a larger scale in the direction of the arrow II in Fig. 1.

Fig. 3 is a plan view of an adjustable base.

Figs. 11 and 12 are diagrammatic explanatory views.

Figure 4:
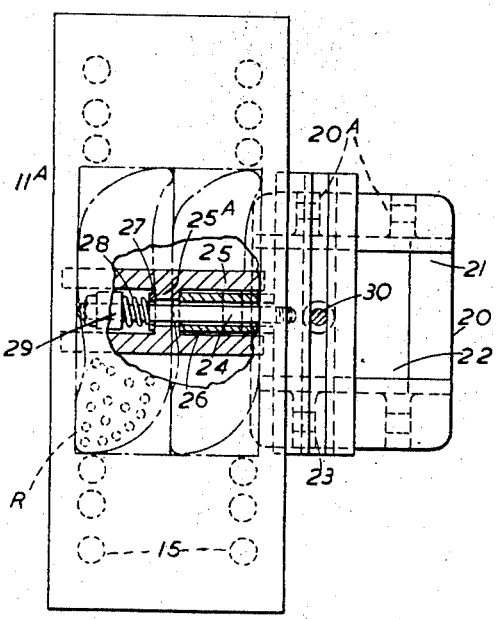
Fig. 4 is a plan view on the line IV—IV of Fig. 5 which is an elevation, partly in section, in the direction of the arrow V in Fig. 2.

Referring especially to Fig. 1 the drilling machine will be described only briefly because it is of well known type. It comprises a base 1 and column 2 supporting a drill head 3 carrying the drill 4 which is rotated by belting 5 from the electric motor 6 and which is vertically reciprocated by the shaft 7 oscillated by the connecting rod 8 which is actuated by the disc 9 driven throuh belts from the electric motor 10.

In a machine as shown the work table is moved under the drill to enable the requisite rows of holes to be drilled in the brush head at the required spacing, for example, there may be four spaced rows R as indicated in chain dotted lines in Fig. 4. This movement is effected by the operator and there is usually provided a template or pattern and a complementary guide element which the operator has to guide or enter into each hole in the pattern. The holes in each row along the length of the brush head have to be angularly arranged relatively to one another in order to properly position the bristle tufts which are inserted into the holes and this is achieved as shown diagrammatically in Fig. 11 where the arrow D represents the drill. The work table 11 is supported on a column or the like pivoted at the bottom so that the table can swing and thus angle relatively to the drill to give the desired position. Reference to the dotted position shows that the swinging movement causes a decrease in the distance between the table and drill and this entails the use of compensating mechanism to avoid variation in the depths of the drilled holes. The numeral 11A shows a table with a shorter column and it will be noted from the corresponding dotted line position that with a shorter column for the same degree of lateral movement of the table there is a greater degree of angular movement and also a greater variation in distance between the drill and table.

In accordance with one feature of the invention the work table 11 is supported on four rectangularly spaced rods 12 which are universally connected respectively at the top and bottom to the work table 11 and to a base 13 which is vertically adjustable on a screwed column 14. As shown more clearly in Fig. 2 the rods of the inner and outer pair at the inner and outer longer sides of the table converge downwardly and it will be noted that the table is provided underneath with two series of holes 15 (Fig. 4) whereby the convergence may be altered by attaching the upper ends of the links to different holes. The base 13 also has series of holes 16 whereby the convergence of the links can be altered by attaching the lower ends to different ones of the holes. In the case of the base there are four series of holes which thus enable the outer and inner pairs of rods 12 to be arranged in convergent relationship if so desired. As shown, (see Fig. 5), the pairs are arranged in parallel relationship.

In Fig. 12 the central position of the table is shown in full lines. It will be seen from the two dotted positions that swinging movement to either side as far as the chain dotted position does not alter the distance between the table and the drill despite the angular movement of the table. Thus the simple arrangement of convergent radius rods 12 enables the necessary angular and displacement movement of the table without variation of the distance between the drill and part of the table below the drill. Thus no special compensating mechanism is necessary, as it has been hitherto, to ensure uniform depth of drilling. Movement beyond the chain dotted position would cause a variation in the said distance, that is, the permissible swinging movement is limited by the consideration that the top of the radius rods should not pass beyond the axis of the drill. The amount of permissible swinging movement is governed by the distance between the tops of the rods and the amount of angular movement for a given amount of lateral displacement is governed by the length of the rods. If shortened, the rods give a greater degree of angular movement. It will be noted that the rods are of telescopic construction for length variation and that the base 13 can be correspondingly adjusted to maintain the table at the same distance from the drill. As will be later described the table is moved in the direction of its length and also at right angles. The angular movement is required during the first movement but it may be obtained if desired during the latter movement by adjusting the outer and inner pairs of rods to converge.

Figure 6:
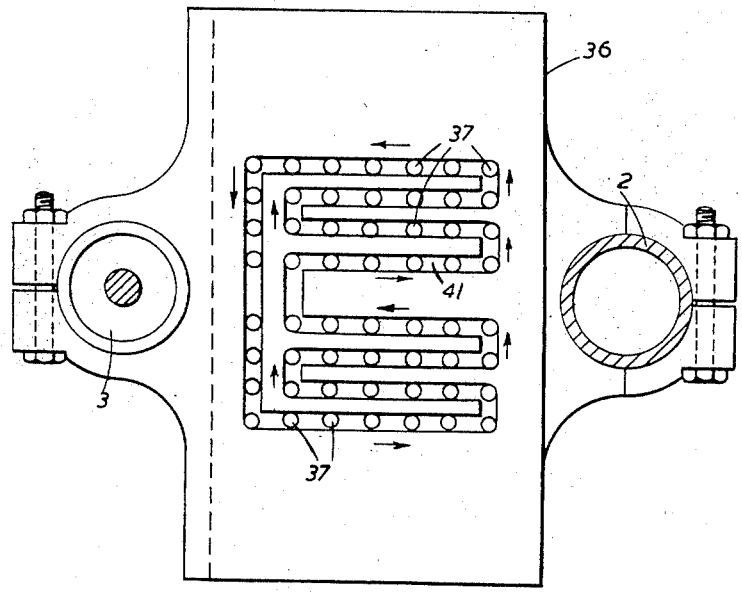
Fig. 6 is an inverted plan view in the direction of the arrow VI in Fig. 5.
Figures 9, 10:
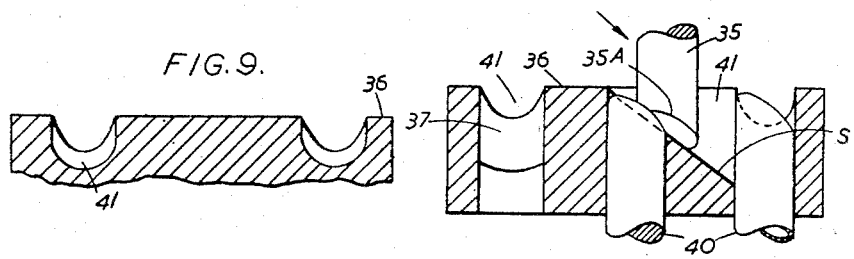
Figs. 9 and 10 are sectional views on the lines IX—IX and X—X of Fig. 8.

The work table is automatically positioned for drilling by a follower mechanism. This comprises two telescopically adjustable support rods 18 pivoted on the flanges 19 of the base 13 for swinging movement in the direction of the length of the table. At the top ends these rods are pivoted to downward flanges 20A of a support member 20 which thus executes an arcuate, parallel swinging movement and which has an undercut guide track 21 at right angles to this movement. In this track there is a slide 22 which has on its top a slot 23 of inverted T-shape. Screwed to the slide there is a screwed connecting rod 24 which at its other end passes through and is connected to the central bar 25A of an H-shaped formation 25 below the work table (Fig. 4). The rod passes with substantial clearance through a hole in the bar 25A and on its inner end there is attached a spacer block 26 which is of square cross section and slidably fits between the longer limbs of the H-formation. One end of the block engages the bar 25 and the other slide 22. On the outer end there is a washer 27 engaging the central bar 25A and engaged by a compression spring 28 of which the other end engages a square block 29 on the rod which block slidably engages between the longer limbs of the H-formation and is retained by a nut. Thus swinging movement of the member 20 is imparted to the table 11 by the rod 24 whose connection with the H-formation allows relative pivotal movement about the axis of the rod, this movement being required in view of the angular movement of the table. The rod has clearance in the hole in the H-formation to allow a limited play and universal movement against the action of the spring 28, which movement is necessary because there is a slight rise and fall movement between the support member 20 and the work table 11 because the former falls slightly as it swings off centre. Swinging movement of the work table in the direction of its width is also imparted through the rod 24 and the slide 22 which can move along the track 21. Here again there may be relative angular and slight up and down movement between the rod and the work table such movement being permitted by the universal connection above referred to. In the slot 23 there is attached the head of a screw 30 which is screwed to a cup 31 spaced up from the slide 22 by the sleeve 32. In this cup there is slidably received a plunger member 33 which is normally urged upwards by the compression spring 34. In the plunger there is slidably located a follower pin 35 which engages a track member 36 which is attached to the drill head 3 for up and down movement therewith. In the track member there are located a plurality of holes 37 spaced to correspond with the spacing of the holes to be drilled in the brush head. As shown in Fig. 6 there may be two sets of four rows of holes 37, there being two sets because the work table is adapted to hold two brush heads so that a completed one can be removed and a new one inserted into the usual clamp means 11A while the other is being operated on. Above the track member 36 there is a plate 39 attached to the column 2 by a collar as shown in Figs. 1 and 5 and having a set of releasing pins 40 spaced to enter all the holes 37. The track member has a continuous track 41 which is of semi-circular cross section (Fig. 9) and which interconnects all the holes 37 and which slopes steeply down from one hole to the other as, for example, at S, Fig. 10. The top end of the follower pin 35 is inclined correspondingly and is also rounded, that is, its end 35A (Fig. 10) may be regarded as an oblique semi-cylindrical surface which closely fits the surface of the track (Fig. 10). The ends of the releasing pins are hollowed and inclined and complementary to the end of the follower pin.

In operation the spring urges the follower pin into engagement with a hole. As the drill head rises so does the track member and follower pin until the latter engages the corresponding release pin. As the track member rises further the follower pin, stopped by the release pin, clears the top of the inclined slot and then due to the pressure of the spring and the incline the follower pin slides down the incline to the next hole and abuts against the release pin which projects up through the next hole. When the drill head comes down again for the next drilling operation the release pin withdraws and allows the follower pin to enter said next hole and thus position the work table correctly for drilling the next hole in the head. Thus the follower pin will move stepwise from hole to hole in the direction of the arrows, Fig. 6, the spring and inclination providing the motive power derived from the up and down movement of the drill head. It will thus be evident that the follower mechanism will automatically drill the desired pattern of holes.

Figure 7:
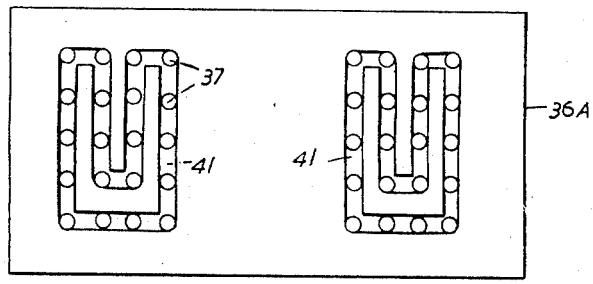
Fig. 7 is a similar plan view of a modification.
Figure 8:
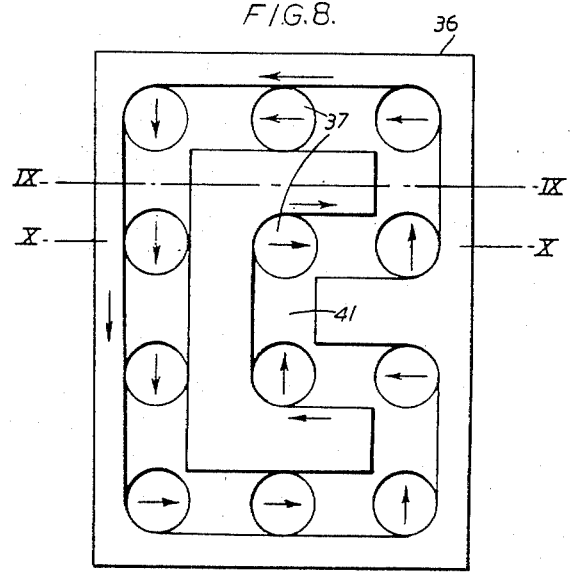
Fig. 8 is a plan view to a larger scale of a further modified track member.

Figs. 7 and 8 show alternative patterns of holes, the arrangements of the tracks in Figs. 6, 7 and 8 all being such as to give the desired pattern with a closed path involving only a slight or no loss of time. This is especially notable in Fig. 8 which provides three rows of holes. If these rows were drilled in straightforward zig-zag fashion the follower would have to be returned by a path external to that shown with consequent loss of working time.

The track member in Fig. 7 has two sets of holes and tracks, each set being adapted to be engaged by a follower. This arrangement, or arrangements with even more than two followers, are useful where small closely spaced holes are to be drilled. In such case one follower might not be robust enough to stand the stresses involved. In the Fig. 6 arrangement, which has two sets of holes, the follower, which moves in the direction of the arrows, moves from one set when completed to the other in continuous fashion. Thus there is no interruption as a fresh brush head can be inserted ready for drilling while the other is being drilled.

It will be understood that the follower mechanism has a wide range of application to drilling and the like machine where a tool or other instrument has to perform a series of operations as a predetermined pattern on the work.

What I claim is:

1. A mechanism for automatically positioning in a series of predetermined relative positions a work holder and a tool which are capable of relative translational movement and relative advancing and separative movement, said mechanism comprising a track member having track means therein and a plurality of locating recesses located along the track at predetermined positions, the track being sloped down from one recess to the next recess, a follower member urged to engage the track so that the track slope causes the follower member to move along the track until stopped by engagement in the recess, and release means for removing the follower from the recess on to the top of the next track slope to cause the follower to be urged relatively to the track means to engage and be retained by the next recess and so cause a step of said relative translational movement.

2. A mechanism for positioning an element in a plurality of predetermined positions which comprises a track member including a track with retaining recesses spaced along the track, a follower pin which is engageable in the track or recesses, a resistant opposing separation of the track member and follower pin and releasing means for engaging the pin to disengage the pin from the recess against the action of the resistant, the track being so sloped between the recesses that the pressure of the pin on the track due to the resistant causes relative movement between the pin and track member until the pin engages and is retained by the next recess, said relative movement being transmitted to the element.

3. A mechanism as claimed in claim 2, in which the recesses consist of holes extending from the track side to the other side of the track member and in which the releasing means comprises pins having oblique ends adapted to engage and push the follower pin out of the hole, the slope of such end being such as to cause the follower pin to move on to the track slope.

4. A mechanism as claimed in claim 2, in which the recesses consist of holes extending from the track side to the other side of the track member and in which the releasing means comprises pins having oblique ends adapted to engage and push the end of the follower pin, which is of complementary oblique shape, out of the hole, the slope of the ends being such as to cause the follower pin to move on to the track slope.

5. A mechanism as claimed in claim 2, in which the track is of curved cross section and in which the recesses consist of holes extending from the track side to the other side of the track member and in which the releasing means comprises pins having oblique ends adapted to engage and push the end of the follower pin, which is of complementary oblique shape, out of the hole, the slope of the ends being such as to cause the follower pin to move on to the track slope and the end of the follower pin being curved to fit snugly in the track.

6. A mechanism as claimed in claim 2, in which the track is endless to enable continuous operation.

7. A mechanism as claimed in claim 2, in which the track is endless with the last recess or hole adjacent the first to minimise loss of time between successive cycles of operation.

8. A mechanism for automatically and relatively positioning a drill and work holder to drill a plurality of holes in a predetermined pattern, said mechanism comprising a track member including a track with retaining holes along the track, a follower pin which is engageable in the track or holes and is connected to the work holder, spring means normally maintaining pressure between the track and follower and release means for engaging the follower to cause the follower to disengage from the hole against the spring means, said release means being connected with the drill so as to be actuable by relative separating movement between the drill and work holder, the track being so sloped from one hole to the next that when the follower is disengaged from the hole and located on the slope the spring pressure causes relative translational movement of the follower along the track to the next hole to position the drill and work holder for drilling the next holes.

9. A mechanism for automatically and relatively positioning a drill holder and work holder to drill a plurality of holes in a predetermined pattern, said mechanism comprising a track member including a track with retaining holes spaced along the track, a follower pin which is engageable in the track or holes, spring means normally maintaining pressure between the track and follower and release means engageable with the follower to cause the follower to disengage from the hole, said release means being connected with the drill holder so as to be actuable by relative separating movement between the drill and work holder, the track being so sloped from one hole to the next that when the follower is disengaged from the hole and located on the slope the spring pressure causes relative translational movement of the follower which has connection with the work holder along the track to the next hole to position the work holder for drilling the next holes, a mounting for the holder or table comprising spaced radius rods pivotally connected to the table and to a support, the connections to the table being spaced apart a greater distance than the connections to the support so that swinging movement of the table caused by the follower does not alter or substantially alter the distance between the drill and the table along the drill axis.

10. A mechanism for automatically positioning an element in a plurality of predetermined positions, which comprises a track member including a track with retaining recesses spaced along the track, a follower which is engageable with the track or recesses, a resistant opposing separation of the track member and follower and releasing means for relatively separating the follower and track member against a resistant to disengage the follower and recess, the track being so sloped between the recesses that the pressure of the follower on the track due to the resistant causes relative movement between the follower and track member until the follower engages and is retained by the next recess, said relative movement being transmitted to the element.

11. A mechanism for positioning an element in a plurality of predetermined positions which comprises a track member including a track with retaining holes through said member and spaced along the track, a follower pin which is engageable in the track or recesses, spring means normally maintaining pressure between the pin and track, releasing pin means movable into said holes for disengaging the follower pin from the hole against the action of the spring means, the track being so sloped between the holes that the spring pressure of the pin on the track causes relative movement between the pin and track member until the pin engages in and is retained by the next hole, said relative movement being transmitted to said element.

12. A mechanism for positioning an element in a plurality of predetermined positions which comprises an endless track member including a track with retaining holes through said member and spaced along the track, a follower pin which is engageable in the track or recesses, spring means normally maintaining pressure between the pin and track, releasing pin means movable into said holes for disengaging the follower pin from the hole against the action of the spring means, the track being so sloped between the holes that the spring pressure of the pin on the track causes relative movement between the pin and track member until the pin engages in and is retained by the next hole, said relative movement being transmitted to said element.

13. A mechanism for positioning an element in a plurality of predetermined positions which comprises a track member including a track with retaining holes through said member and spaced along the track, a follower pin which is engageable in the track or recesses, spring means normally maintaining pressure between the pin and track, releasing pin means movable into said holes for disengaging the follower pin from the hole against the action of the spring means, the track being so sloped between the holes that the spring pressure of the pin on the track causes relative movement between the pin and track member until the pin engages in and is retained by the next hole, said relative movement being transmitted to said element, and the follower pin and releasing pin having an oblique end meeting face serving to cause the follower pin to ride on to the high point of the next track section as the follower pin is pushed out of the hole.

14. A mechanism for automatically and relatively positioning two elements capable of approaching and receding (first) movement and also capable of relative translational (second) movement transverse to said first movement, said mechanism comprising a track member including a track with retaining holes spaced along the track, a follower pin which is engageable in the track or holes, spring means normally maintaining pressure between the track and pin, releasing pin means interconnected with one of the elements to be actuable by the said first movement to disengage the follower pin from a retaining hole against the action of the spring means, the track being so sloped from one hole to the next that when the follower is disengaged from the hole and located on the slope the spring pressure causes relative translational movement of the follower along the track to the next hole, and means interconnecting the follower and track member with said elements so that said relative movement of the follower and track member movement causes said second movement of the elements in stepwise fashion.

15. A mechanism as claimed in claim 14, in which said track is endless.

16. A mechanism as claimed in claim 14, in which the releasing pin means consists of pins having oblique ends adapted to engage and push the follower pin out of the hole, the slope of such end being such as to cause the follower pin to move on to the track slope.

17. A mechanism as claimed in claim 14, in which the releasing means comprises pins having oblique ends adapted to engage and push the end of the follower pin, which is of complementary oblique shape, out of the hole, the slope of the ends being such as to cause the follower pin to move on to the track slope.

18. A mechanism as claimed in claim 14, in which the track is of curved cross section and in which the recesses consist of holes extending from the track side to the other side of the track member and in which the releasing means comprises pins having oblique ends adapted to engage and push the end of the follower pin, which is of complementary oblique shape, out of the hole, the slope of the ends being such as to cause the follower pin to move on to the track slope and the end of the follower pin being curved to fit snugly in the track.

19. A mechanism for automatically and relatively positioning two elements capable of approaching and receding (first) movement and also capable of relative translational (second) movement transverse to said first movement, said mechanism comprising a track member including a track with retaining holes spaced along the track, a follower pin which is engageable in the track or holes, spring means normally maintaining pressure between the track and pin, a set of release pins engaging the holes and interconnected with one of the elements to be actuable by said first movement to protrude from the holes and disengage the follower pin from a retaining hole against the action of the spring means, the track being so sloped from one hole to the next that when the follower is disengaged from the hole and located on the slope the spring pressure causes relative translational movement of the follower along the track into engagement with the next release pin and then along the track to engage in the hole when said release pin is retracted.

20. A mechanism for automatically and relatively positioning two elements capable of approaching and receding (first) movement and also capable of relative translational (second) movement transverse to said first movement, said mechanism comprising a hole member having a series of spaced retaining holes, a follower pin which is engageable in any one of said holes, spring means normally urging the pin and recess member together, a releasing pin engaging in said hole and interconnected with one of the elements to be actuable by said first movement to engage endwise with and push the follower pin out of the hole against the action of the spring means, the engaging ends of the follower and release pin including an oblique face of such slope that when the follower pin is clear of the hole the spring pressure causes the follower pin to ride off the release pin towards the next hole and cause a relative translational movement between the hole member and the follower pin, and comprising means interconnecting the follower pin and hole member with said elements so that said relative movement of the follower pin and hole member causes said second movement of the elements in stepwise fashion.

21. A mechanism for positioning an element in a plurality of predetermined positions comprising a follower pin, a track-presenting means, spring means urging the pin and track-presenting means together in the direction of the pin axis, said track-presenting means including a plurality of sloped ended members movable endwise against the follower pin to move the latter axially against the spring means so that the pressure of the latter by reaction on the slope causes movement of the pin transverse to the axis thereof along the track.

JOHN McFARLANE.

REFERENCES CITED

The following references are of record in the file of this patent:

UNITED STATES PATENTS

| Number | Name | Date |
| --- | --- | --- |
| 557,303 | Cowperthwait | Mar. 31, 1896 |
| 698,829 | Flemming | Apr. 29, 1902 |
| 1,930,013 | Mahren | Oct. 10, 1933 |
| 2,044,339 | Terhune | June 16, 1936 |

FOREIGN PATENTS

| Number | Country | Date |
| --- | --- | --- |
| 30,739 | Norway | May 18, 1920 |